(12) United States Patent
Lee et al.

(10) Patent No.: US 7,835,326 B2
(45) Date of Patent: Nov. 16, 2010

(54) METHOD AND APPARATUS FOR SCHEDULING DATA PACKET TRANSMISSION ACCORDING TO QOS IN A MOBILE COMMUNICATION SYSTEM

(75) Inventors: Dong-Jun Lee, Songnam-shi (KR); Jae-Ho Jeon, Songnam-shi (KR); Ji-Won Lee, Songnam-shi (KR); Sung-Kwon Jo, Seoul (KR); Seung-Joo Maeng, Songnam-shi (KR); Sung-Won Lee, Songnam-shi (KR); Sang-Hyun Yang, Songnam-shi (KR)

(73) Assignee: Samsung Electronics Co., Ltd (KR)

( * ) Notice: Subject to any disclaimer, the term of this patent is extended or adjusted under 35 U.S.C. 154(b) by 2314 days.

(21) Appl. No.: 10/316,589

(22) Filed: Dec. 11, 2002

(65) Prior Publication Data

US 2003/0198207 A1    Oct. 23, 2003

(30) Foreign Application Priority Data

Dec. 11, 2001   (KR) .................... 10-2001-0078120

(51) Int. Cl.
*H04B 7/216* (2006.01)

(52) U.S. Cl. .................... 370/335; 370/338; 370/229; 370/331; 370/328; 370/342; 370/332; 370/252; 370/441; 455/450; 455/452.2; 455/442

(58) Field of Classification Search ................ 370/335, 370/338, 229, 331, 332, 252, 342, 328, 352, 370/441; 455/450, 452.2, 442, 437
See application file for complete search history.

(56) References Cited

U.S. PATENT DOCUMENTS

| | | | | |
|---|---|---|---|---|
| 5,115,429 A | * | 5/1992 | Hluchyj et al. | 370/231 |
| 5,666,655 A | * | 9/1997 | Ishikawa et al. | 455/512 |
| 5,923,650 A | * | 7/1999 | Chen et al. | 370/331 |
| 5,999,825 A | * | 12/1999 | Geulen | 455/560 |
| 6,078,818 A | * | 6/2000 | Kingdon et al. | 455/456.5 |
| 6,317,435 B1 | * | 11/2001 | Tiedemann et al. | 370/441 |
| 6,335,922 B1 | * | 1/2002 | Tiedemann et al. | 370/335 |
| 6,345,038 B1 | * | 2/2002 | Selinger | 370/230 |

(Continued)

FOREIGN PATENT DOCUMENTS

| KR | 1020010046636 A | 6/2001 |
|---|---|---|
| KR | 20010056754 A | 7/2001 |

*Primary Examiner*—Marceau Milord
(74) *Attorney, Agent, or Firm*—The Farrell Law Firm, LLP

(57) ABSTRACT

A scheduling apparatus for a base transceiver system (BTS), determines a point of data transmission to mobile stations (MSs). The BTS includes buffers for storing data to be transmitted to the MSs. A scheduler determines a priority of each of the MSs taking into account a data rate determined depending on a channel condition between the BTS and the MSs, a required amount of transmission data, and an amount of data to be transmitted to the MSs, and determines an MS having the highest priority among the MSs, as a destination MS to which data is to be transmitted by the BTS. The scheduler increases the required amount of transmission data upon receipt of a retransmitted data packet, and decreases the required amount of transmission data after transmitting data to the MSs.

15 Claims, 4 Drawing Sheets

U.S. PATENT DOCUMENTS

| | | | |
|---|---|---|---|
| 6,385,451 B1 * | 5/2002 | Kalliokulju et al. | 455/437 |
| 6,515,972 B1 * | 2/2003 | Gage et al. | 370/328 |
| 6,564,061 B1 * | 5/2003 | Guo et al. | 455/452.1 |
| 6,748,220 B1 * | 6/2004 | Chow et al. | 455/450 |
| 6,760,344 B2 * | 7/2004 | Mizell et al. | 370/475 |
| 6,801,776 B2 * | 10/2004 | Notanii et al. | 455/451 |
| 6,847,610 B1 * | 1/2005 | Suumaki et al. | 370/230.1 |
| 6,850,506 B1 * | 2/2005 | Holtzman et al. | 370/335 |
| 6,873,856 B2 * | 3/2005 | Voyer | 455/522 |
| 6,901,046 B2 * | 5/2005 | Hsu et al. | 370/204 |
| 6,937,561 B2 * | 8/2005 | Chiussi et al. | 370/229 |
| 6,937,584 B2 * | 8/2005 | Chaponniere et al. | 370/335 |
| 6,968,190 B1 * | 11/2005 | Suumaki et al. | 455/436 |
| 6,975,613 B1 * | 12/2005 | Johansson | 370/338 |
| 6,980,523 B1 * | 12/2005 | Lipford et al. | 370/252 |
| 6,987,738 B2 * | 1/2006 | Subramanian et al. | 370/252 |
| 6,996,061 B2 * | 2/2006 | Yang et al. | 370/233 |
| 7,023,825 B1 * | 4/2006 | Haumont et al. | 370/338 |
| 7,042,856 B2 * | 5/2006 | Walton et al. | 370/329 |
| 7,292,553 B2 * | 11/2007 | Tiedemann et al. | 370/335 |
| 7,330,439 B1 * | 2/2008 | Puuskari et al. | 370/252 |
| 7,349,425 B2 * | 3/2008 | Leung et al. | 370/465 |
| 2002/0093976 A1 * | 7/2002 | Razoumov et al. | 370/444 |
| 2003/0081627 A1 * | 5/2003 | Bao et al. | 370/444 |
| 2004/0120306 A1 * | 6/2004 | Wigard et al. | 370/349 |

* cited by examiner

METHOD AND APPARATUS FOR SCHEDULING DATA PACKET TRANSMISSION ACCORDING TO QOS IN A MOBILE COMMUNICATION SYSTEM

This application claims priority to an application entitled "Method and Apparatus for Scheduling Data Packet According to QoS in a Mobile Communication System" filed in the Korean Industrial Property Office on Dec. 11, 2001 and assigned Serial No. 2001-78120, the contents of which are incorporated herein by reference.

BACKGROUND OF THE INVENTION

1. Field of the Invention

The present invention relates generally to a mobile communication system, and in particular, to a method for scheduling data packet transmission in a mobile communication system supporting time division multiplexing (TDM) for a shared link.

2. Description of the Related Art

A $3^{rd}$ generation mobile communication system includes CDMA2000 (Code Division Multiple Access 2000), WCDMA/UMTS (Wideband CDMA/Universal Mobile Telecommunications System), GPRS (General Packet Radio System), and CDMA2000 1xEV-DO (Evolution Data Only) mobile communication systems. Unlike the typical $2^{nd}$ generation mobile communication system supporting only a voice service or a low-speed data service, the $3^{rd}$ generation mobile communication system supports the voice service and also a high-speed packet data service and a moving picture communication service. The mobile communication system includes a base station controller (BSC), a base transceiver system (BTS), and a mobile station (MS). The BSC is connected to the BTS by wire, and the BTS is connected to the MS through a radio channel.

In the mobile communication system, when the BSC communicates with a specified MS among a plurality of MSs through the BTS, the BSC sequentially transmits transmission data packets to the BTS to which the specified MS belongs. The BTS then buffers (or stores) the received data packets in its buffer, and sequentially transmits the buffered data packets to the specified MS for a time period where a radio resource is available. A technique for sharing one radio resource, or one transmission channel, by a plurality of MSs is called "time division multiplexing (TDM)."

In a mobile communication system transmitting data packets by the TDM, determining a time period for which the data packets are transmitted to MS is called "scheduling," and radio resources of BTS are properly assigned to a plurality of MSs by the scheduling. A scheduler for the scheduling operation exists in BTS, and the MS periodically reports the quality of a BTS signal received over a radio channel to the scheduler. The scheduler selects a particular MS, to which it will transmit data, every scheduling period, taking into account quality information of radio channels received from a plurality of MSs and an absence/presence of data to be transmitted to each MS.

A data service in the conventional mobile communication system is based on the so-called "best effort service." That is, a condition of a data service provided to a particular mobile subscriber (or MS) is determined based on a radio channel quality of the subscriber and availability of a radio resource with which each BTS services subscribers. Therefore, if an amount of service data provided by one BTS to other subscribers, not including the particular subscriber, is increased or a radio channel quality of the corresponding subscriber becomes worse, then an amount of data provided to the subscriber is decreased.

However, a certain subscriber may want to secure a better service quality, or a higher data rate, at any cost. In addition, a service provider may also want to provide a better service quality to a particular subscriber, for example, a long-term subscriber. However, as stated above, in providing a packet data service, the conventional mobile communication system considers only the quality of a radio channel and the availability of radio resources, and does not consider service requirements of the subscriber. Therefore, in order to provide a service quality on a level requested by the subscriber, it is necessary to provide differential services according to a QoS (Quality of Service) class.

SUMMARY OF THE INVENTION

It is, therefore, an object of the present invention to provide a method for providing a QoS (Quality of Service) requested by a subscriber in a TDM-based mobile communication system.

It is another object of the present invention to provide a method for scheduling data packet transmission to an MS, considering radio channel quality information and a QoS class of the MS.

To achieve the above and other objects, the present invention provides a scheduling apparatus of a base transceiver system (BTS), for determining a point of data transmission to mobile stations (MSs) in a mobile communication system including the BTS and at least two MSs connected to the BTS. Buffers store data to be transmitted to the MSs. A scheduler determines priority of each of the MSs, considering a data rate determined depending on a channel condition between the BTS and the MSs, a required amount of transmission data, and an amount of data to be transmitted to the MSs, and determines an MS having the highest priority among the MSs, as a destination MS to which data is to be transmitted by the BTS.

Preferably, the priority of the MSs is proportional to the data rate determined depending on a channel condition between the BTS and the MSs, the required amount of transmission data, and the amount of data to be transmitted to the MSs.

Preferably, the scheduler performs the scheduling at periods of a time slot.

Preferably, the required amount of transmission data is a minimum amount of transmission data that can be transmitted for a selected time period. The scheduler increases the required amount of transmission data upon receipt of a retransmitted data packet, and decreases the required amount of transmission data after transmitting data to the MSs.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In the following description, a mobile communication system according to the present invention provides a QoS (Quality of Service) on a desired level to a subscriber who requests a differential data service according to a QoS class. More specifically, the present invention relates to the QoS class of an MS, scheduling by a scheduler in a BTS, assignment of a radio traffic channel taking these into consideration, and a message exchange between the BTS and the MS. Such an invention can be performed by the scheduler in a BTS constituting a TDM-based mobile communication system.

Figure 1:
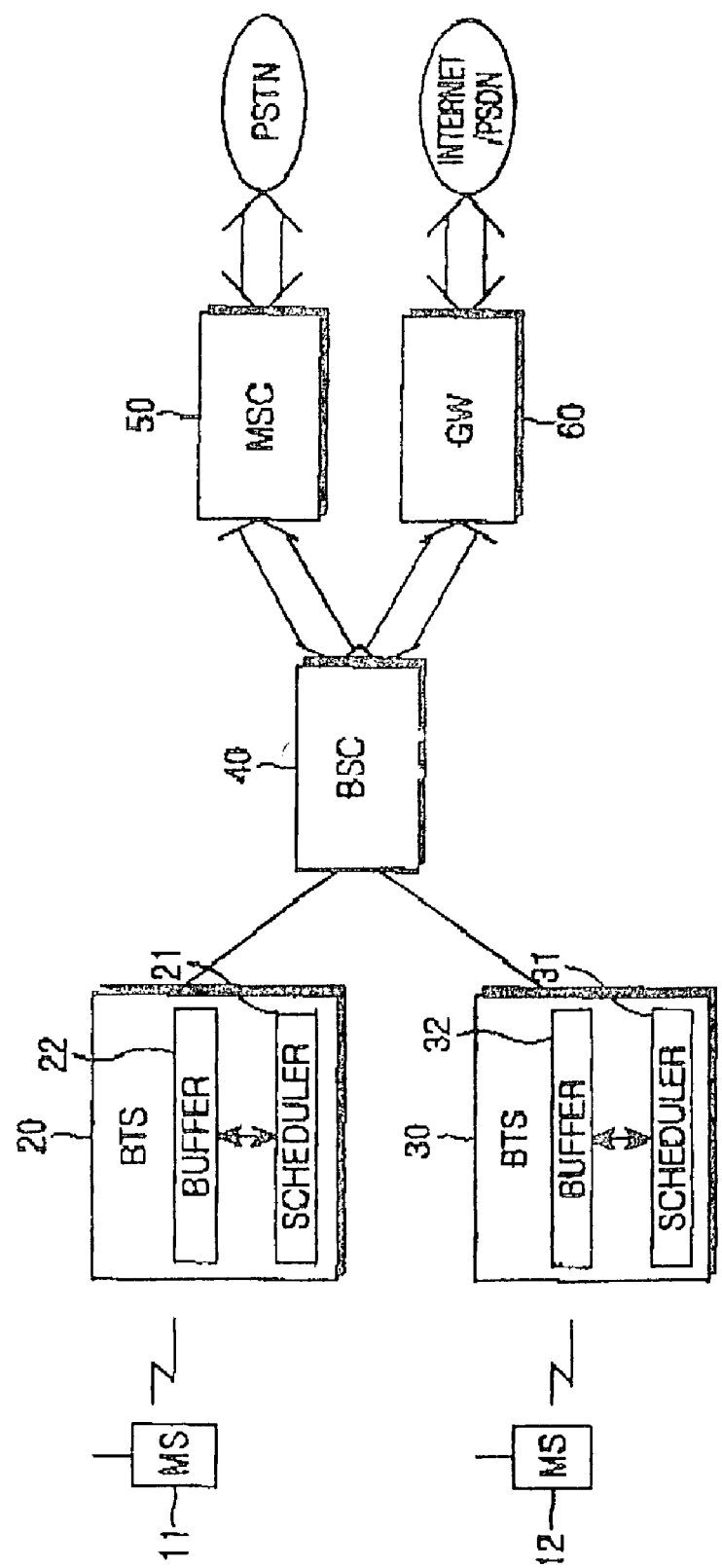
FIG. 1 illustrates a network configuration of a mobile communication system to which the present invention is applied.

FIG. 1 illustrates a network configuration of a mobile communication system to which the present invention is applied. Such a mobile communication system provides a mobile subscriber with a voice service and a packet service.

Referring to FIG. 1, the mobile communication system includes MSs (or subscribers) 11 and 12, BTSs 20 and 30 connected to the MSs 11 and 12, respectively, and BSC 40 connected by wire to the BTSs 20 and 30. The BSC 40 is connected to a mobile switching center (MSC) 50 and a gateway (GW) 60. The MSC 50 is connected to a circuit network such as PSTN (Public Switched Telephone Network), and the GW 60 is connected to a packet switched network such as Internet/PSDN (Public Switched Data Network). If the MS 11 is connected to the MSC 50 under the control of the BSC 40, the MS 11 is provided with a voice service, and if the MS 11 is connected to the GW 60, the MS 11 is provided with a packet data service FIG. 1 is a generalized network configuration of a mobile communication system. Therefore, the names of the elements are subject to a change according to the type of the mobile communication system (e.g., IS-2000, WCDMA, UMTS, CDMA2000 1xEV-DO, GPRS, CDMA2000 1xEV-DV, etc.). For example, the GW 60, being a logical name, can be called packet data serving node (PDSN), access gateway (AG), or media gateway (MG). As another example, the GW 60 and the MSC 50 can be united into the same system.

In such a mobile communication system, call setup and data transmission between the MSs 11 and 12 and the BTSs 20 and 30 are performed according to QoS class. The QoS class is determined as a band assignment class for a channel bearer and a queuing class for traffic control during initial call setup by the MS in the mobile communication system. Particularly, according to the present invention, the QoS class is determined according to a data rate requested by the MS, and the BTS guarantees a data rate requested by the MS subscribed to the QoS service.

In order to select MSs, which are given priority in using a radio resource, according to the QoS class, it is necessary to consider QoS classes of MSs having transmission data every scheduling period. For such QoS service and scheduling operation, the BTSs 20 and 30 include buffers 22 and 32, and schedulers 21 and 31, respectively.

Figure 2:
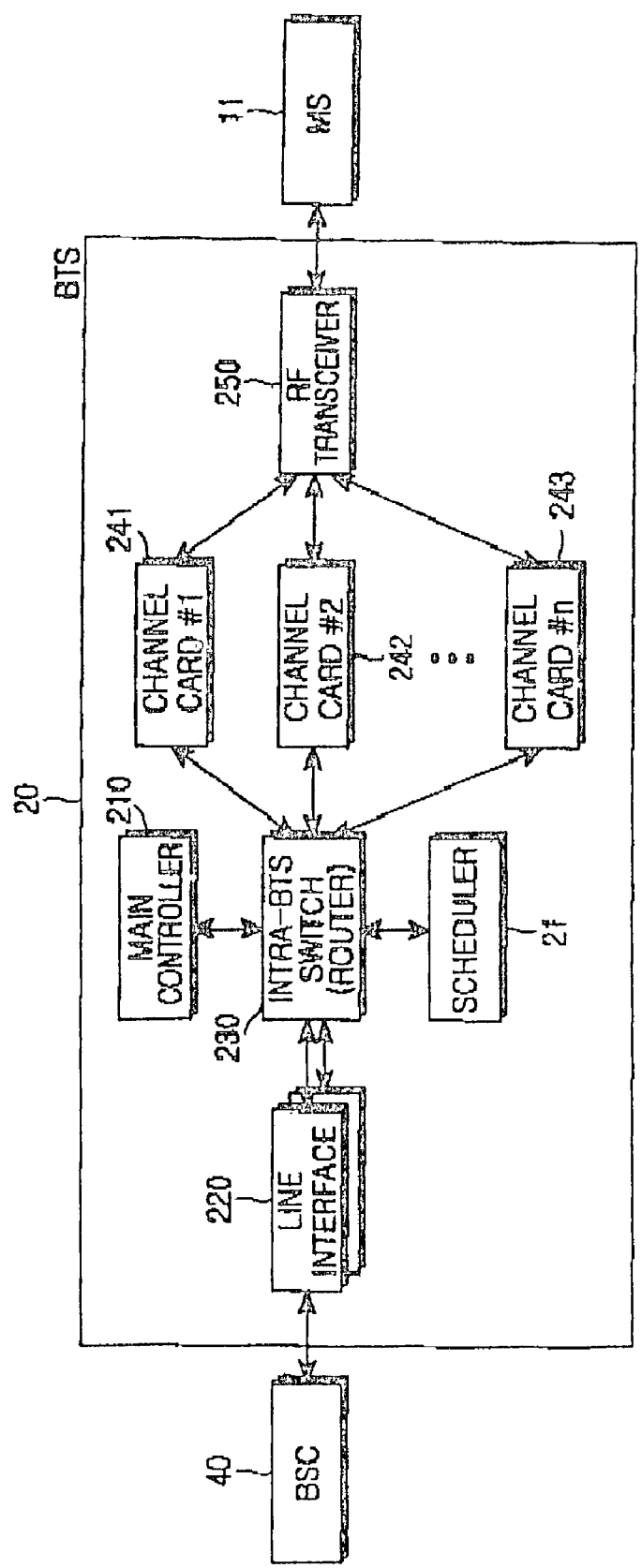
FIG. 2 illustrates a detailed structure of the BTS illustrated in FIG. 1.

FIG. 2 illustrates a detailed structure of the BTS 20 illustrated in FIG. 1. Although FIG. 2 illustrates a detailed structure of the BTS 20 in FIG. 1, the BTS 30 also has the same structure.

Referring to FIG. 2, the BTS 20 includes a main controller 210, a line interface 220, an intra-BTS switch (or router) 230, channel cards 241~243, an RF (Radio Frequency) transceiver 250, and a scheduler 21. The main controller 210 controls the overall operation of the BTS 20. The line interface 220 connects the BTS 20 to the BSC 40. The RF transceiver 250 exchanges data and control signals in the form of RF signals with the MS 11. The intra-BTS switch 230 determines a traffic path in the BTS. The scheduler 21 supports efficient management of radio resources.

Figure 3:
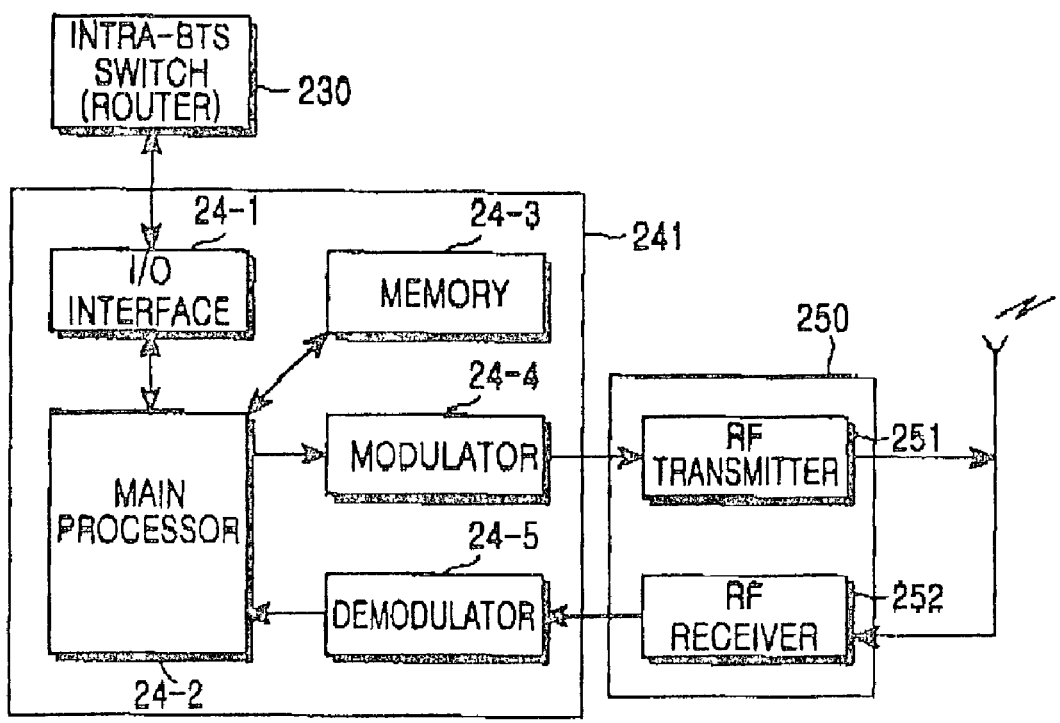
FIG. 3 illustrates a detailed structure of the channel cards illustrated in FIG. 2.

FIG. 3 illustrates a detailed structure of the channel card 241 illustrated in FIG. 2. Although FIG. 3 illustrates a detailed structure of the channel card 241 in FIG. 2, the other channel chards 242~243 also have the same structure.

Referring to FIG. 3, the channel card 241 includes an input/output interface 24-1, a main processor 24-2, a memory 24-3, at least one modulator 24-4, and at least one demodulator 24-5. The input/output interface 24-1 connects the channel card 241 to the intra-BTS switch 230. The modulator 24-4 modulates data and a control signal to be transmitted to the MS 11 through an RF transmitter 251 in the RF transceiver 250. The demodulator 24-5 demodulates data and a control signal received from the MS 11 through an RF receiver 252 in the RF transceiver 250. The modulator 24-4 and the demodulator 24-5, as they form their forward and reverse channels, are also called a channel element (CE). The memory 24-3 includes an internal buffer (the buffer 22 as illustrated in FIG. 1) for receiving packet data to be transmitted to the MS 11 from the BSC 40 and temporarily storing the received packet data. In addition, the memory 24-3 can store various control information.

Upon receiving a call setup request for a QoS service, the BTS 20 determines whether there is a radio resource, or channel element, available for the channel cards 241~243. If there is no available radio resource, the BTS 20 refuses the call setup request and provides this information to the MSC 50 or the GW 60 through the BSC 40. Otherwise, if there is an available radio resource, the BTS 20 determines whether the radio resource can accept a data rate requested for the QoS service.

If there is an available radio resource but the radio resource cannot accept the requested data rate, the BTS 20 refuses the call setup request and provides this information to the MSC 50 or the GW 60 through the BSC 40. Otherwise, if there is an available radio resource and the radio resource can accept the requested data rate, the BTS 20 assigns a channel element in response to the call setup request, and sets a link and an intra-BTS switching or routing path connected to the BSC 40. Further, the BTS 20 transmits a call setup request permit message to the MSC 50 or the GW 60 via the BSC 40.

After a call is set up in response to the call setup request, the MS 11 periodically measures the strength of a signal received from the BTS 20 over a forward link, and transmits data rate control information (DRC) corresponding to the measured signal strength to the BTS 20. The DRC is a value indicating quality information of the radio channel. This DRC is expressed in a 4-bit DRC value normally transmitted over a dedicated DRC channel, and is transmitted over the DRC channel every time slot.

Table 1 illustrates an example of DRC values transmitted over a DRC channel in a 1xEV-DO system.

TABLE 1

| DRC Value | Data Rate |
| --- | --- |
| 0000 | 38.4 kbps |
| 0001 | 76.8 kbps |
| 0010 | 102.4 kbps |
| 0011 | 153.6 kbps (short) |
| 0100 | 153.6 kbps (long) |
| 0101 | 204.8 kbps |
| 0110 | 307.2 kbps (short) |
| 0111 | 307.2 kbps (long) |
| 1000 | 614.4 kbps |
| 1001 | 921.6 kbps |
| 1010 | 1228.8 kbps |
| 1011 | 1843.2 kbps |
| 1100 | 2457.6 kbps |
| 1101 | Reserved |
| 1110 | Reserved |
| 1111 | Reserved |

As illustrated in Table 1, the 4-bit DRC values are mapped to associated data

Other MSs, which have set up a call in a service area of the BTS 20, also transmit DRC to the BTS 20 through the same procedure as stated above. The BTS 20 assigns a buffer to each of the MSs that have set up a call. Upon receipt of a data packet from the BSC 40, the BTS 20 determines a destination MS for the received data packet, and stores the received data packet in a buffer prepared for the determined destination MS. To this end, the BTS 20 includes as many buffers as the number of MSs that can be supported by the BTS 20.

The scheduler 21 of the BTS 20 performs period scheduling, considering DRC values received from MSs having set up a call, a required amount of transmission data (hereinafter, referred to as "required transmission amount" for short), and an amount of data to be transmitted. Here, the DRC value, a value determined depending on a channel condition between the BTS 20 and the MSs, represents a data rate as illustrated in Table 1. As a result of the scheduling, if data transmission to a specific MS is permitted, the scheduler 21 reads a data packet from a buffer for the corresponding MS and transmits the read data packet to a shared channel element. The data packet is transmitted to the corresponding MS over a transmission channel formed by the channel element.

A QoS service according to the present invention is performed by a scheduler in the BTS. That is, the scheduler determines whether to approve data transmission, based on a required QoS class, to MSs that have requested the QoS service, and schedules data transmission to the MSs, i.e., data transmission that is approved, every scheduling period.

To this end, the BTS determines QoS service-related parameters in the call setup procedure. The QoS service-related parameters include a "QoS service period" and a "required transmission amount." The BTS guarantees to transmit as much data as the "required transmission amount" to the MS for the "QoS service period." A value determined by dividing the "required transmission amount" by the "QoS service period" becomes a data rate required for the MS. Here, the "required transmission amount" represents the number of data packets, and the "QoS service period" can be set to about 10 or more slots by the system. Such QoS service-related parameters are determined when the MS first subscribes to the QoS service, and stored in a subscriber database of a home location register (not shown) in the mobile communication system. The QoS service-related parameters stored in the subscriber database are provided to the BTS by the MSC or the GW in the call setup procedure. Alternatively, the QoS service-related parameters are determined through negotiations between the BTS and the MS in the call setup procedure.

A scheduler of the BTS determines an amount of data to be transmitted (or the number of data packets to be transmitted), stored in a buffer of the BTS every scheduling period, and sets a token value indicating a permissible amount of transmission data based on the determined result. That is, the scheduler manages a token value indicating a permissible amount of data transmitted from the BTS to MS, with respect to each MS that has requested the QoS service.

If there is transmission data in a buffer for the MS that has requested the QoS service, a token value of the corresponding MS is increased by the "required transmission amount" at the beginning of each "QoS service period." In addition, each time a packet retransmission request is received from the MS, the token value is increased by an amount of the retransmission packet.

If the token value is not "0," the BTS transmits data in the buffer to the MS and then determines whether the data transmission is complete. Otherwise, if the token value is "0," the scheduler of the BTS does not permit transmission even though there is data to be transmitted to the MS in the buffer. If transmission of the data is complete, the token value is reduced by as much as an amount of the transmitted data. Each time the "QoS service period" expires, the scheduler of the BTS determines whether the buffer has data to transmit. If the buffer is empty, the token value for the MT is cleared to "0."

Particularly, if the token value is not "0," i.e., if data transmission based on a QoS class is permitted, the BTS transmits data at maximum power available only for one MS selected every scheduling period among MSs to which transmission of the data is permitted, at a data rate required by the selected MS. At this moment, the BTS transmits data at high speed to an MS with the best channel condition for each scheduling period, thereby increasing its data throughput. Preferably, the scheduling period has the same time period as a time slot of a transmission channel.

Figure 4:
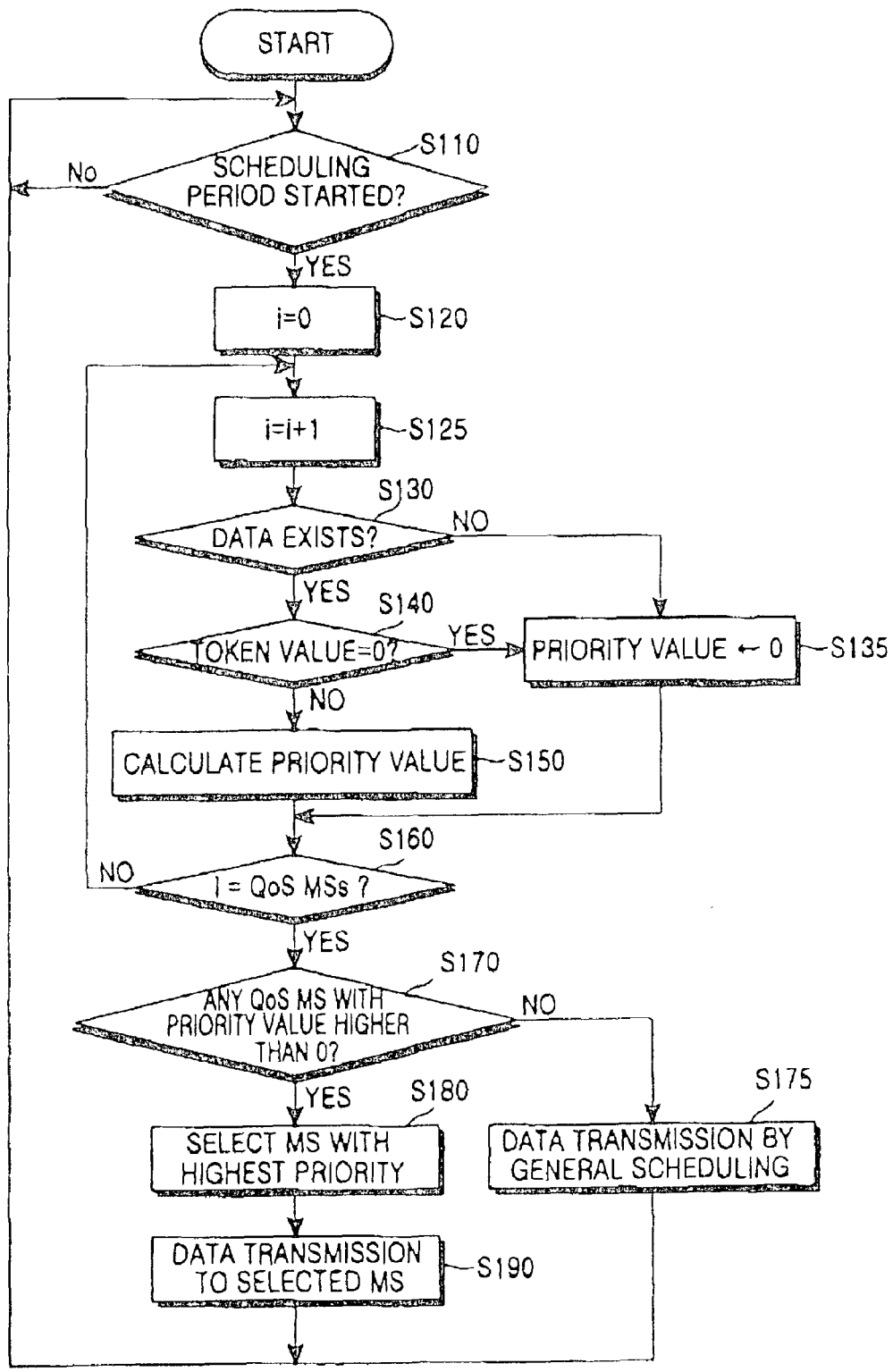
FIG. 4 illustrates a scheduling operation on a data packet according to an embodiment of the present invention.

Below, a scheduling operation according to the present invention will be described with reference to FIG. 4. It should be noted herein that the scheduling operation of FIG. 4 is performed by the scheduler 21 of the BTS 20 illustrated in FIG. 1. In addition, the BTS 20 connects a call to at least one MS, and provides a QoS service to the MS. Herein, the MS being provided with the QoS service will be referred to as a "QoS MS," for short, and the QoS MS periodically measures the quality (or strength) of a signal transmitted from the BTS 20, and reports radio channel quality information DRC to the BTS 20.

Referring to FIG. 4, whenever each scheduling period (each time slot of a transmission channel) is started in step S210, the scheduler 21 initializes a variable i to "0" in step S220, increases the variable i by 1 in step S225, and then proceeds to step S230. The variable i is used to check all QoS MSs to which a call is currently connected.

In step S230, the scheduler 21 determines whether there is data in a buffer for a particular QoS MS to be first checked. If the buffer is empty, i.e., if there is no data to be transmitted to the QoS MS, the scheduler 21 sets a priority value for the QoS MS to "0" in step S235. However, if the buffer is not empty, the scheduler 21 determines in step S240 whether a token value for the QoS MS is "0," in order to determine whether it has an authority to transmit data to the QoS MS. If the token value is "0," the scheduler 21 sets a priority value of the QoS MS to "0" in step S235, determining that it has no authority to transmit data. Otherwise, if the token value for the QoS MS is not "0," the scheduler 21 calculates a priority value for the QoS MS in step S250. A detailed description of the operation in the step S250 will be made herein below.

When the scheduler 21 calculates the priority value in step S250, the priority value $V_{PRI}$ is proportional to a last received DRC value $DRC_{LAST}$, a token value $V_{TOKEN}$, and an amount $A_{DATA}$ of data left in the buffer, and is inversely proportional to an average DRC value $DRC_{AVG}$, and a time period $T_{REMAIN}$ remaining until an end of a QoS service period. The priority value is calculated by $$V_{PRI} = \frac{DRC_{LAST}^a}{DRC_{AVG}^b} \cdot \frac{V_{TOKEN}^c \cdot A_{DATA}^d}{T_{REMAIN}^e} \qquad \text{Equation (1)}$$

In Equation (1), a, b, c, d, and e are real numbers over 0, set by the system, and used to adjust weights of factors which are taken into account when calculating a priority value. In addition, the average DRC value represents an average of DRC values received for a selected time period, or an average of data rates corresponding to the DRC values.

After calculating the priority value, the scheduler 21 compares the variable i with the number of QoS MSs to which a call is currently connected in step S160, in order to determine whether the priority value has been calculated for all QoS MSs. If there remains any QoS MS for which the priority value has not been calculated yet, the scheduler 21 returns to step S125 to increase the variable i by 1, and then repeats the steps S130 to S150 to calculate priority values for the remaining QoS MSs. Otherwise, if priority values for all the QoS MSs have been completely calculated, the scheduler 21 proceeds to step S170.

In step S170, the scheduler 21 determines whether there is any QoS MS, the priority value for which is larger than "0" (i.e., not equal to "0"). If the priority values for all the QoS MSs are "0," the scheduler 21 performs data transmission by general scheduling in step S175. The general scheduling performed in step S175 is performed when there is no data to transmit, or when as much data as the required transmission amount has already been transmitted for the QoS service period, and the general scheduling does not consider a required transmission amount for the QoS MS. Otherwise, if there is at least one QoS MS, the priority value for which is larger than "0," the scheduler 21 proceeds to step S180.

In step S180, the scheduler 21 selects a particular QoS MS with the largest priority value among the QoS MSs, the priority values for which are not "0." The QoS MS selected by the scheduler 21 is assigned one dedicated time slot. In step S190, the scheduler 21 transmits data stored in a buffer for the selected MS to the selected MS over the assigned time slot.

In this manner, the mobile communication system according to the present invention performs scheduling by considering the priorities of MSs that have requested a QoS service, thereby supporting a required data rate.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A scheduling method for a base transceiver system (BTS) in a mobile communication system including the BTS and at least two mobile stations (MSs) connected to the BTS, the method comprising the steps of:
   determining a priority of each of the MSs, considering a data rate determined depending on a channel condition between the BTS and the MSs; and
   determining an MS having a highest priority among the MSs, as a destination MS to which data is to be transmitted by the BTS,
   wherein the priority of each of the MSs is proportional to an amount of data remaining in a buffer and is inversely proportional to an average data rate.

2. The scheduling method of claim 1, wherein the priority of each of the MSs is proportional to the data rate determined depending on the channel condition between the BTS and the MSs.

3. The scheduling method of claim 1, wherein the channel condition between the BTS and the MSs is reported by the MSs to the BTS.

4. The scheduling method of claim 1, wherein the priority of each of MSs is inversely proportional to the average data rate determined depending on the channel condition between the BTS and the MSs and a time period remained by an end of a QoS service period.

5. The scheduling method of claim 1, wherein determining the priority of each of the MSs further considers a required amount of transmission data and an amount of data to be transmitted to the MSs.

6. The scheduling method of claim 5, wherein the required amount of transmission data is a minimum amount of transmission data that can be transmitted for a selected time period.

7. The scheduling method of claim 5, further comprising the step of increasing the required amount of transmission data upon receipt of a retransmitted data packet.

8. The scheduling method of claim 5, further comprising the step of decreasing the required amount of transmission data after transmitting data to the MSs.

9. A scheduling apparatus for a base transceiver system (BTS), in a mobile communication system including the BTS and at least two MSs connected to the BTS, the apparatus comprising:
   buffers for storing data to be transmitted to the MSs; and
   a scheduler for determining a priority of each of the MSs, considering a data rate determined depending on a channel condition between the BTS and the MSs, and determining an MS having a highest priority among the MSs, as a destination MS to which data is to be transmitted by the BTS,
   wherein the priority of each of the MSs is proportional to an amount of data remaining in the buffers and is inversely proportional to an average data rate.

10. The scheduling apparatus of claim 9, wherein the priority of each of the MSs is proportional to the data rate determined depending on the channel condition between the BTS and the MSs.

11. The scheduling apparatus of claim 9, wherein the scheduler further considers a required amount of transmission data and an amount of data to be transmitted to the MSs for determining the priority of each of the MSs.

12. The scheduling apparatus of claim 11, wherein the required amount of transmission data is a minimum amount of transmission data that can be transmitted for a selected time period.

13. The scheduling apparatus of claim 11, wherein the scheduler increases the required amount of transmission data upon receipt of a retransmitted data packet.

14. The scheduling apparatus of claim 11, wherein the scheduler decreases the required amount of transmission data after transmitting data to the MSs.

15. The scheduling apparatus of claim 9, wherein the priority of each of MSs is inversely proportional to the average data rate determined depending on the channel condition between the BTS and the MSs and a time period remained by an end of a QoS service period.

* * * * *